Jan. 14, 1969 JAMES E. WEBB 3,422,213
ADMINISTRATOR OF THE NATIONAL AERONAUTICS
AND SPACE ADMINISTRATION
CONNECTOR STRIPS
Filed April 21, 1966

Charles R. Peek
Lewis E. Boodley
INVENTORS

BY
ATTORNEYS

Charles R. Peek INVENTORS
Lewis E. Boodley

BY G. T. McCoy
Leonard Rawicz
ATTORNEYS 3,422,213
Patented Jan. 14, 1969

3,422,213

CONNECTOR STRIPS

James E. Webb, Administrator of the National Aeronautics and Space Administration with respect to an invention of Charles R. Peek, Medford Lake, N.J., and Lewis E. Boodley, Morrisville, Pa.

Filed Apr. 21, 1966, Ser. No. 545,535
U.S. Cl. 174—72 6 Claims
Int. Cl. H02g 3/00

ABSTRACT OF THE DISCLOSURE

Thin, electrically conductive connector strips for electrically and mechanically coupling a plurality of electrical elements, such as solar cells, are constructed such that the various sections thereof are joined by stress relieved areas. With particular application to the interconnection of solar cells in the formation of an array, the connectors have the ability to accommodate repeated expansion and contraction cycles and, at the same time, still maintain maximum electrical output from the array.

The invention described herein was made in the performance of work under a NASA contract and is subject to the provisions of section 305 of the National Aeronautics and Space Act of 1958, Public Law 85–568 (72 Stat. 435; 42 U.S.C. 4257).

This invention relates to connector strips and more specifically to thin, electrically conductive strips for coupling a plurality of electrical elements, such as solar cells, in circuit with each other.

In certain applications, it is necessary to connect a plurality of similar devices in circuit with each other. For example, one such instance involves the coupling of a plurality of solar cells in predetermined configurations so as to provide required voltage and/or current requirements.

The cells are formed in modules and when a group of modules is assembled in an array, the exposure of the array to radiant energy, such as that generated by the Sun, will cause a voltage to apepar upon the conductors joining the cells and modules. Thus, a current will flow upon the insertion of a load across the conductors. Such a source of power is commonly employed in many space platforms and satellites due to the availability of the solar energy from the Sun.

If one envisions a space craft orbiting the earth and bearing a solar array, it is evident that the space craft and array will be alternately exposed to areas flooded with solar energy followed by areas wherein the solar energy is excluded. Understandably, the Earth would at times be positioned between the solar cell array and the Sun so as to exclude the solar energy from impinging upon the cells. It is evident that each exposure of the solar cell array to the solar energy is accompanied by an increase in the temperature of the cells, connecting bus bars, etc., and that each time the space craft enters a zone of darkness, the temperature of the foregoing elements will be quickly reduced.

The alternate cycles of heating and cooling of the space craft is accompanied by an expansion and contraction which is in accordance with usual temperature-expansion curves. It will be readily evident that this contraction and expansion will be deleterious to the conductors in their relationship to the solar cells to the point where the conductors may fracture or separate thus reducing or eliminating the efficiency of the system. If a rigid bus bar is employed for interconnecting the cells, the efficiency of the cells may be reduced due to breakage and other factors. Accordingly, if a suitable source of power is to be supplied by a solar cell array, then means must be employed to permit the contraction and expansion of the elements, including the bus bars, so that the efficiency of the array is not impaired. The foregoing is achieved by providing an electrical connection or bus bar which will accommodate the flexing caused by repeated contractions and expansions due to temperatures and any other factors which may affect the array.

Accordingly, it is the principal object of the present invention to improve connectors of the electrical type.

It is a further object of the present invention to increase the fatigue limits of electrical connectors coupled between electrical elements.

It is a further object of the present invention to reduce or eliminate the fracture of electrical connectors subjected to repeated thermal and/or vacuum cycles.

It is a further object of the present invention to provide an electrical connector for coupling electrical cells in circuit wherein the sheer stress transmitted to the cell is minimized.

It is a still further object of the present invention to provide an electrical connector for interconnecting electrical cells which permits a stress relief of the connector with respect to the cell so as to reduce or eliminate the possibility of damage to the cell or the connector.

These and other objects of the present invention are accomplished by providing a connector of the flat strip type which includes a stress relieved area in the form of a plurality of integral strand-like portions, the stress relieved area being of greater flexibility than adjacent portions of the strip. By chemically milling the connector strips, areas may be formed in the strip which take the form of short strands or sections which connect adjacent portions of the flat strip to thereby permit relative movement between adjacent sections of the strip. Since the strands are formed integrally with the strip and are a part thereof, the electrical characteristics of the strip connector are not altered in any way. Since the strands which are of a dimension much less than that of the flat strip are incorporated into the connector, the strip may readily flex, expand or contract with the strand-like areas absorbing the motion. Thus, the expansion and contraction of the elements of the array do not electrically affect the output of the solar cells since the novel connectors of the present invention maintain good electrical contact with the solar cells at all times even though the elements of the array may be elongated or shortened due to thermal changes.

The invention both as to its organization and method of operation together with further objects and advantages thereof will best be understood by reference to the following specification taken in conjunction with the accompanying drawings in which.

Figure 1:
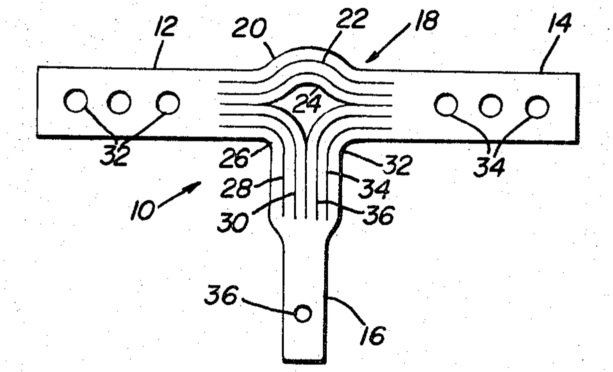
FIGURE 1 illustrates a T connector wherein the sections of the T are joined by the strand-like areas.

With reference to the FIGURE 1, a T connector 10 includes a first flat section 12, a substantially identical second flat section 14, and a third flat section 16, disposed at right angles to the sections 12 and 14, the sections 12, 14, and 16 being joined by a stress relieved area 18.

The stress relieved area 18 may be chemically milled from a continuous, flat section of material such as beryllium-copper to the configuration shown in the FIGURE 1. Although beryllium-copper is the preferred metal for the connector shown in the invention, other metals may be employed such as nickel, copper-tin-phosphorous alloy, nickel-silver, copper, etc.

The stress relieved area 18 of the FIGURE 1 includes a plurality of strands 20, 22 and 24 which are formed integrally with and join the sections 12 and 14. A plurality of strands or strand-like portions 26, 28 and 30 connect the first flat section 12 to the third flat section 16 while a plurality of similar strands or strand-like portions 32, 34 and 36 connect the second flat section 14 to the third flat section 16. Although three such strands or portions are shown as interconnecting the flat sections 12, 14 and 16, it will be readily understood that any number of strands may be employed as found convenient. The strands 20, 22, 24, 26, 28, 30, 32, 34 and 36 are formed integrally with the material of the T connector 10 and are not separate sections or portions which are in some manner attached to their respective flat sections.

The stress relieved area 18 now permits relative motion between the flat sections 12, 14 and 16, the motion being "absorbed" by the strands. That is to say, the stress relieved area 18 is of a greater flexibility than the adjacent flat sections 12, 14 and 16. The sections 12 and 14 may move toward or away from each other and the connecting strands will resposition themselves accordingly. Similarly, the third section 16 may move with respect to the sections 12 and 14 and cause the connecting strands to be repositioned and thus minimize any effects caused by the movement of one flat section with respect to the other flat sections.

A plurality of apertures 32 may be formed in the section 12 and similar apertures 34 may be formed in the section 14. Further, an aperture 36 may be formed in the third section 16 and the apertures 32, 34 and 36 may serve as inspection ports after the subsequent soldering of the connector 10 to groups of solar cells or modules of these cells.

Figure 2:
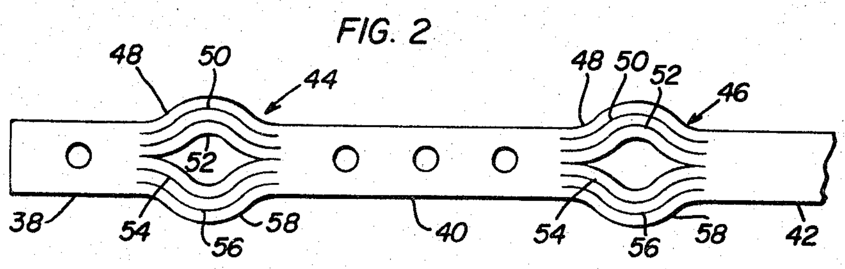
FIGURE 2 is another embodiment of a connector in accordance with the present invention, the connector being of the longitudinal type.

The FIGURE 2 represents another embodiment of a connector formed in accordance with the teaching of the present invention and although several configurations and embodiments are set forth it will be readily understood by those skilled in the art that the connectors may take any form as found convenient or required. The connector of the FIGURE 2 may be viewed as an elongated strip comprised of a first section 38, a second section 40, a third section 42, and any subsequent sections (not shown) as found desirable. The first section 38 is joined to the second section 40 by a stress relieved area 44 while the second section 40 is joined to the third section 42 by a similar stress relieved area 46. Each of the stress relieved areas 44 and 46 include a first group of strands or strand-like portions 48, 50 and 52 and a substantially similar group of strands or strand-like portions 54, 56, and 58. Due to the coupling of the sections 38 and 40 by the stress relieved area 44 and the sections 40 and 42 by the stress relieved area 46, independent motion may be performed by any of the sections without significantly affecting an adjoining section. A number of apertures may be formed in the sections as shown, and the number being that found convenient or required.

Figure 3:
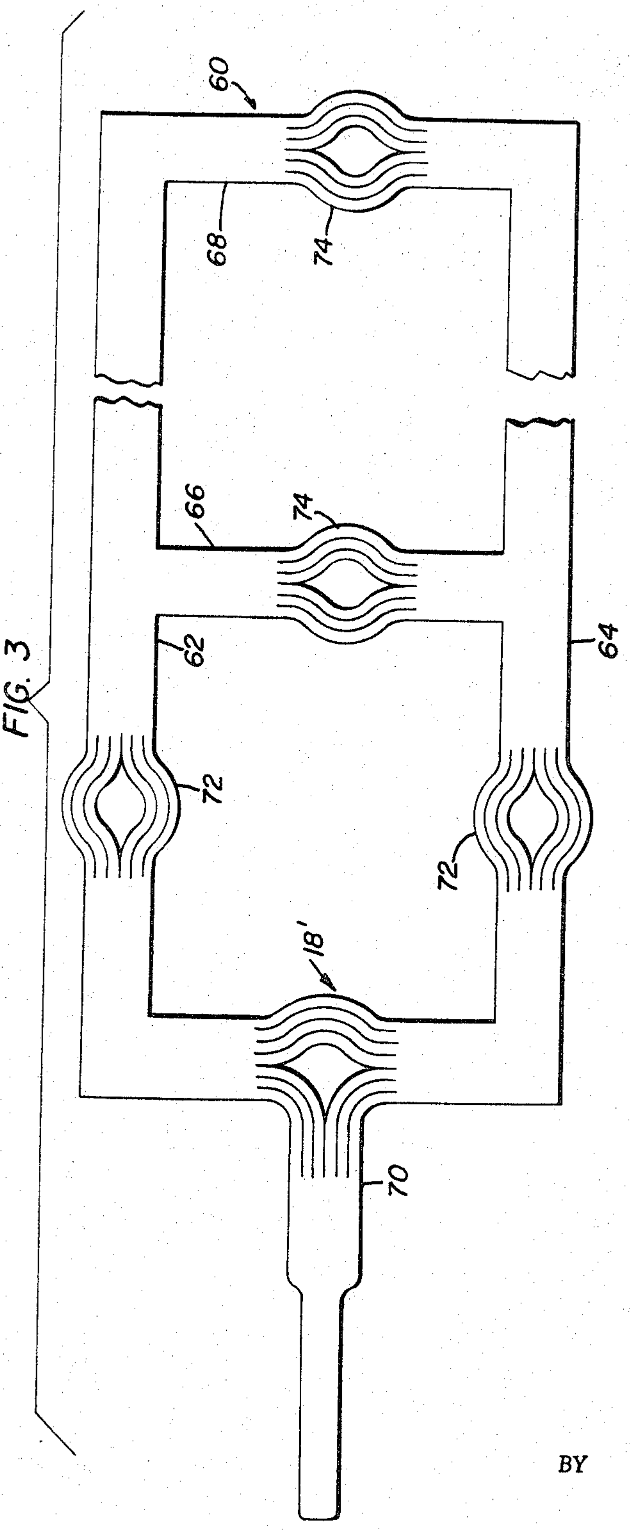
FIGURE 3 illustrates a further embodiment of the invention wherein a plurality of electrical elements may be coupled to the rectangular connector, the connector providing stress relief at all points.

The FIGURE 3 illustrates a further embodiment of a connector which may be formed from a group of connectors such as that shown in the FIGURES 1 and 2 by soldering appropriate connector strips in order to form the connector of the FIGURE 3, or preferably the connector 60 is formed from a single piece of material. The connector 60 includes a first elongated strip 62 and a substantially parallel second elongated strip 64 which are joined by the transverse sections 66 and 68. An end strip 70 couples the first elongated strip 62 to the second elongated strip 64, as shown. The connection is through a stress relieved area 18' similar to the stress relieved area 18 of the FIGURE 1. The first elongated strip 62 is subdivided into a plurality of sections which are joined by stress relieved areas 72, which are similar to the stress relieved areas 44 and 46 of the FIGURE 2. The transverse sections 66 and 68 similarly support stress relieved areas 74 and each of the stress relieved areas 18', 72 and 74 include a plurality of strands or strand-like portions previously set forth and described with reference to the FIGURES 1 and 2. Thus, it is readily apparent that the flat section of the connector 60 may move independently with little or no effect upon adjacent sections, the independent motion being accomplished through the repositioning of the strand-like portions in connecting the respective flat sections.

Figure 4:
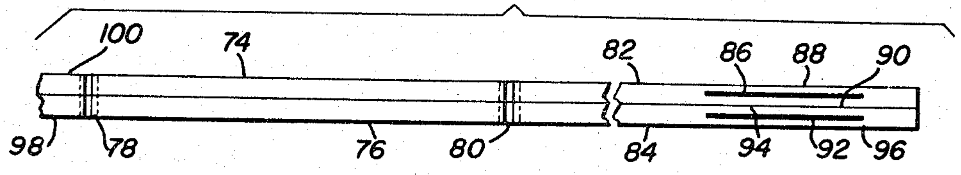
FIGURE 4 is a plan view of a further embodiment of the invention which illustrates a connector having strand-like stress relief areas as well as crimped areas for permitting contraction and expansion of the connector.
Figure 5:
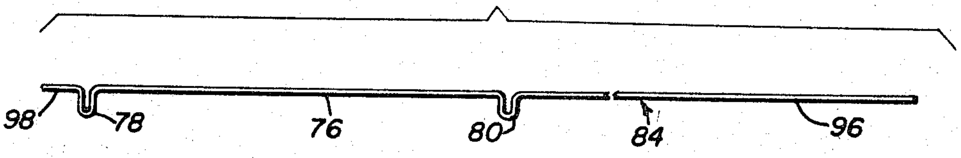
FIGURE 5 is an elevational view of the connector of the FIGURE 4.

The FIGURES 4 and 5 illustrate a further embodiment of the invention. In this embodiment, similar parallel strips 74 and 76 are periodically interrupted by a crimped area 78 and 80. It will be understood that there will be as many sections 74 and 76 with the interrupting crimped areas 78 (or 80) as found desirable. To the right of the crimp 80, a pair of flat sections 82 and 84 extend therefrom. In the section 82 is etched an elongated slot 86 which then divides the section 82 into a pair of strands or strand-like portions 88 and 90. Similarly, a slot 92 is formed in the section 84 so that the section 84 in the area of the slot or aperture 92 is divided into a pair of strands 94 and 96. It will be readily understood that several such slots 86 or 92 may be formed in their respective sections so as to increase the number of strands 88, 90, 94 or 96. A pair of sections 98 and 100 may extend from the crimp 78.

Figure 6:
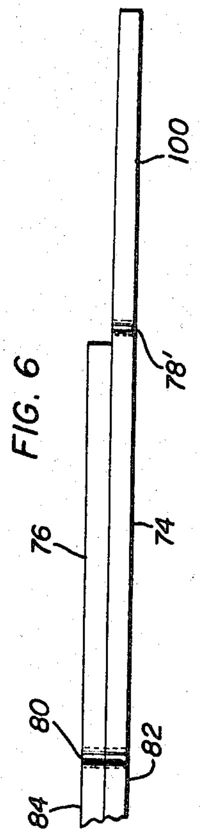
FIGURE 6 is a further embodiment of the connector of the FIGURE 4 and illustrating the removal of one of the sections of the connector to provide the desired configuration.

As shown in the FIGURE 6, the section 98 has been removed at the crimp 78 so that the section 100 singularly extends from the crimp 78'. It will be readily understood that the connector shown in the FIGURES 4 and 5 may be conveniently severed at the crimped areas so as to provide most any type of configuration, one example of which is shown in the FIGURE 6, as found expedient or required.

Thus, there has been illustrated and described a connector which includes appropriate stress relieved areas in the form of strand-like portions which permit connectors of the type set forth to flex, the flexing of one section of a connector having little or no effect upon an adjoining section of the conductor since the adjacent sections are joined by the stress relieved areas in the form of the strands. The strands are integral with the adjoining sections and formed therefrom and may be chemically milled or formed in any other suitable manner. Although in the preferred embodiment, the connectors are formed from beryllium-copper, other suitable metals, such as nickel, copper-tin-phosphorous alloy, nickel-silver, and copper may be employed. The strips may range in thickness from approximately 0.001 inch to 0.010 inch or more.

The connectors thus permit the coupling of a large group of electrical devices such as solar cells, the connectors permitting contraction and expansion of the apparatus without any deleterious effect as the solar cell array may be repeatedly exposed to areas having different temperatures and pressures.

Thus, the present invention may be embodied in other specific forms without departing from the spirit and essential characteristics of the invention. The present embodiment is, therefore to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. A connector of the flat strip type comprising at least first, second, and third sections and a stress relieved area joining all of said sections, said stress relieved area being in the form of a plurality of strand-like portions joining said first and second sections, first and third sections, and second and third sections, said stress relieved area permitting relative motion between all of said sections.

2. The connector of claim 1 wherein said first, second, and third section are disposed in the form of a T, said sections and stress relieved area being integral and of a material selected from the group consisting essentially of beryllium-copper, nickel, copper-tin-phosphorous alloy, nickel-silver, or copper.

3. An electrical connector of the flat strip type comprising a first elongated strip and a substantially parallel second elongated strip, each of said strips formed of a plurality of sections joined to each other by a plurality of integral strand-like portions so as to form stress relieved areas and thereby permit relative motion between sections, said stress areas being of greater flexibility than adjacent sections of said strip, connecting strips joining corresponding sections of each of said elongated strips, each of said connecting strips including a first section with one end connected to said first elongated strip, a second section with one end connected to said second elongated strip, and a stress relieved area of a plurality of integral strand-like portions connecting the other ends of said first section and said second section, respectively; and an end strip joining said first and said second elongated strips, said end strip including at least a first section joined to said first elongated strip, a second section joined to said second elongated strip, a third section, and a stress relieved area joining said first, second and third sections, said stress relieved area being in the form of a plurality of strand-like portions joining said first and second sections, first and third sections, and second and third sections, said stress relieved area permitting relative motion between all of said sections.

4. The connector of claim 3 wherein the material of the connector is selected from the group consisting essentially of beryllium-copper, nickel, copper-tin-phosphorous alloy, nickel-silver, or copper, said end strip is in the form of a T, and each of said strand-like portions are centrally separated so as to form two groups with an opening between the groups.

5. An electrical connector comprising an elongated thin strip of material, said strip being crimped at space intervals along its length; and a stress relieved area formed adjacent one end of said strip and in the plane thereof, said stress relieved area being in the form of a plurality of strand-like portions, said stress relieved area being of greater flexibility than adjacent portions of said strip.

6. The connector of claim 5 wherein said strip is of a material selected from the group consisting essentially of beryllium-copper, nickel, copper-tin-phosphorous alloy, nickel-silver, or copper; and including a substantially similar second strip joined to said strip for at least a portion of its length.

References Cited

UNITED STATES PATENTS 1,967,340 7/1934 Van Splunter ---- 339—222 XR

FOREIGN PATENTS 417,397 10/1934 Great Britain.

DARRELL L. CLAY, *Primary Examiner.*

U.S. Cl. X.R.

174—71, 126; 339—9, 222